United States Patent
Shaper et al.

[15] 3,653,370
[45] Apr. 4, 1972

[54] BARBECUE COOKER

[72] Inventors: Roger T. Shaper; John E. Germann, both of Houston, Tex.

[73] Assignee: Metal Window Products, Inc.

[22] Filed: Aug. 6, 1970

[21] Appl. No.: 61,762

[52] U.S. Cl. ..........................................................126/25 A
[51] Int. Cl. ...........................................A47j 37/00, F24b 3/00
[58] Field of Search...................................126/25, 25 A, 9, 41

[56] References Cited

UNITED STATES PATENTS

| | | | |
|---|---|---|---|
| 3,285,239 | 11/1966 | Drake | 126/25 A |
| 3,557,771 | 1/1971 | Koziol | 126/25 A |
| 3,286,705 | 11/1966 | Bedol | 126/25 A |
| 3,386,432 | 6/1968 | Hanson | 126/41 |
| 3,388,421 | 6/1968 | Koziol | 126/25 UX |
| 3,479,488 | 11/1969 | Klemm | 126/25 UX |
| 3,552,301 | 1/1971 | McNeff | 126/25 |

*Primary Examiner*—Charles J. Myhre
*Attorney*—Pravel, Wilson & Matthews

[57] ABSTRACT

The specification discloses an outdoor barbecue cooker having a housing with means in the housing for supporting a cooking grill at various elevations above the heat source whereby the distance between the heat source and the food being cooked can be adjusted as desired. The means for supporting the grill at various elevations includes a plurality of steps or vertically spaced ledges formed in the rear of the housing and a plurality of recesses formed in the front corners of the housing for supporting the grill.

3 Claims, 5 Drawing Figures

PATENTED APR 4 1972

Roger T. Shaper
John E. Germann
INVENTORS

BY

Pravel, Wilson & Matthews
ATTORNEYS

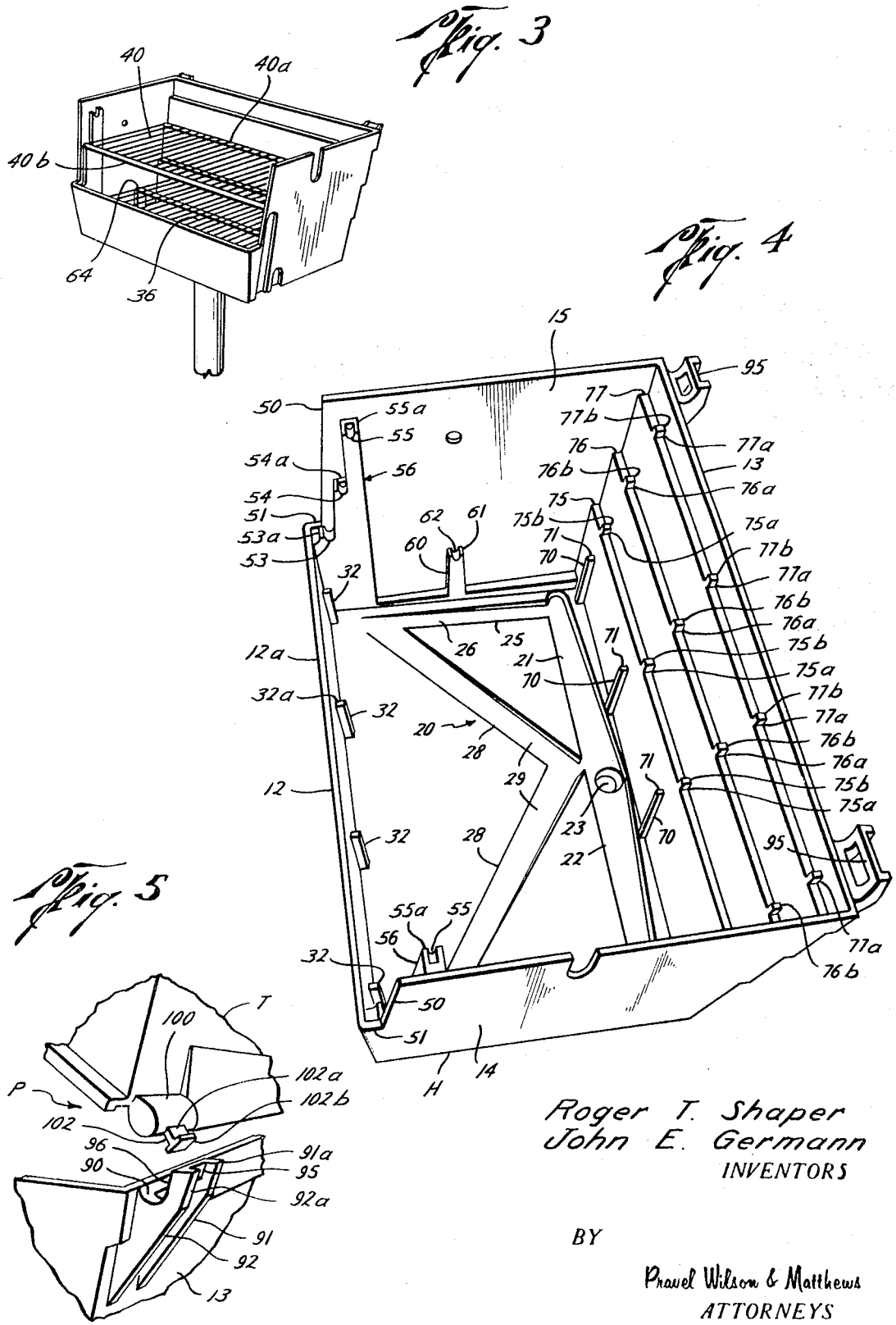

3,653,370

BARBECUE COOKER

BACKGROUND OF THE INVENTION

1. Field of the Invention

The present invention pertains to a barbecue cooker having a molded or cast housing with a removable cover hinged to the housing and a plurality of steps or ledges formed in the rear of the housing for supporting the rear edge of a cooking grill at various elevations above the heat source. A plurality of stepped side supports are spaced vertically at substantially the same intervals as the rear grill supports for supporting the front of the cooking grill substantially level at various elevations above a heat source for cooking.

2. Description of the Prior Art

The prior art barbecue cookers provide various means for varying the elevation of the cooking grill for supporting foods being cooked at different desired heights above the heat source. Some devices include adjustable height grill elements which have mechanical means such as a mechanical screw support for adjusting the elevation of the cooking grill at a desired elevation. These devices are objectionable because of the maintenance problems encountered with a screw type arrangement and also the difficulties and increased expense involved in providing a support at a single point, such as at the center of a cooking grill, rather than a plurality of supports at its perimeter. Also, many of the prior art cooker housings are assembled from several individual pieces rather than molded or cast as a single integral piece which adds to the cost of manufacturing such barbecue cooker grills.

SUMMARY OF THE INVENTION

The present invention provides a new and improved barbecue grill having a housing and a top pivotally mounted on said housing with means in said housing for supporting a cooking grill with food thereon at various elevations above a heat source to permit variations in the time and manner of cooking.

It is also an object of the present invention to provide a new and improved barbecue cooker housing having a plurality of vertically spaced steps in the housing for supporting a cooking grill at various elevations therein.

A further object of the present invention is to provide a new and improved one-piece cast barbecue cooker housing having a removable one-piece top pivotally mounted thereon and having an upwardly and outwardly inclined rear wall with step means therein for supporting the rear edge of the cooking grill, and step means in the sides for supporting the front edge of the cooking grill at substantially the same elevation as the rear edge of the grill.

BRIEF DESCRIPTION OF THE DRAWINGS

FIG. 3 is an isometric view of the cooker housing with the cover removed and showing the food supporting grill and also a fuel supporting grill positioned therein;

FIG. 4 is a perspective view of the inside of the cooker housing showing means for supporting the rear edge and the front edge of the grill; and FIG. 5 is an isometric view of the hinges for pivotally mounting the top of the cooker housing.

DESCRIPTION OF THE PREFERRED EMBODIMENT

Figure 1:
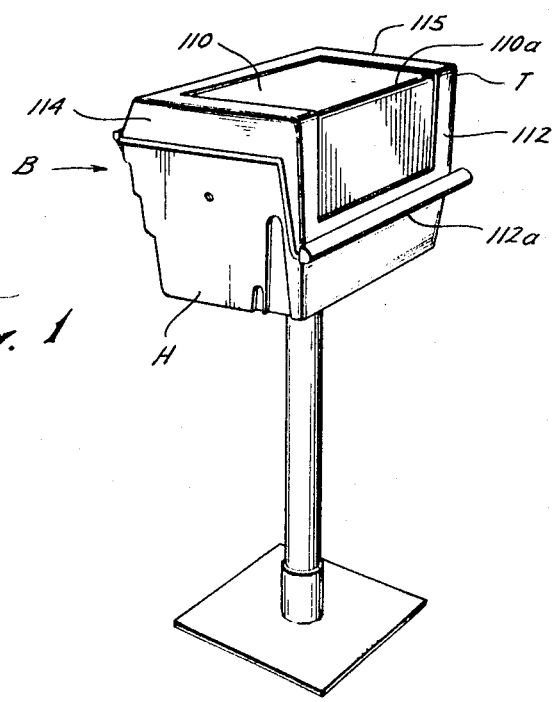
FIG. 1 is an isometric perspective of the front of the barbecue grill of the present invention.
Figure 2:
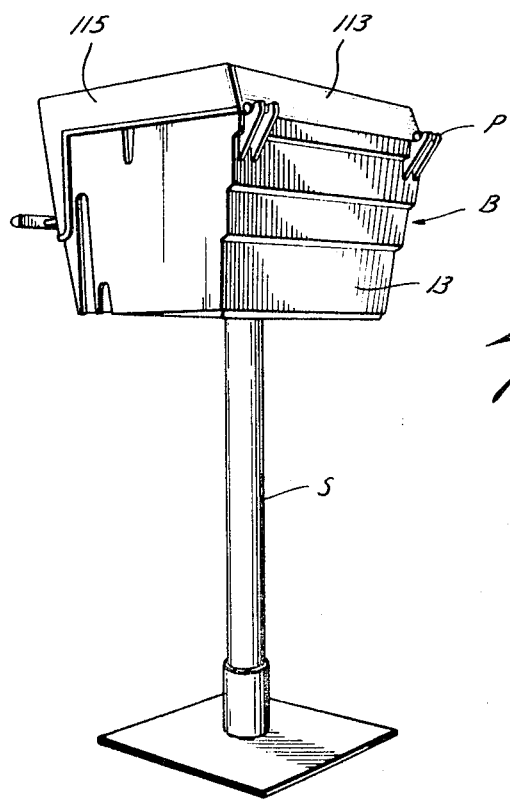
FIG. 2 is an isometric perspective view of the rear of said barbecue cooker.

The preferred embodiment of the barbecue cooker of the present invention is designated generally B in FIGS. 1 and 2 of the drawings. Such barbecue cooker comprises a lower housing H having a top closure member T pivotally mounted on the housing H by means of pivoting hinges P. Such housing H is preferably molded or cast in a single integral piece and is mounted on a stand S which may be either permanently fixed in place or movable from place to place.

Considering now the apparatus of the present invention in more detail, the housing H includes a bottom member 11 with a front wall 12 and a rear wall 13 which extend upwardly and outwardly from such bottom 11 with ends 14 and 15, respectively, also extending upwardly from the bottom 11 and connecting the front and rear walls 12 and 13 to form an enclosure extending around the perimeter of the bottom 11. As best seen in FIG. 4 of the drawings, the bottom 11 comprises a substantially plane sheet which is slightly inclined downwardly from front to rear and having a drainage system designated generally 20 formed therein to facilitate draining grease or other liquids off of the bottom 11 and to prevent such liquids from accumulating thereon.

In the preferred form of the present invention such drainage means 20 includes a longitudinally extending groove or recess 21 which comprises the main drain and which is positioned at the rear of the bottom 11 adjacent the base of the rear wall 13. The drain recess 21 extends substantially from the side 14 to the side 15 across the full width of the bottom 11. Such recess or groove 21 is provided with an inwardly and downwardly inclined bottom 22 that is inclined toward an opening 23 or drain outlet formed in the bottom 11 at approximately the midpoint between the opposite ends of the recess 21. Lateral drain lines or recesses 25 are provided adjacent the opposite side edges of the bottom 11 and adjacent the foot of the sidewalls 14 and 15, respectively. Such lateral drain passages 25 have an inclined bottom 26 which is inclined rearwardly and downwardly toward the outer ends of the main drain line 21 for carrying grease or other liquids from the bottom 11 to the main drain 21 and thence to the drain outlet 23. Also, diagonal feed lines 28 are provided in the bottom 11; such diagonal feed lines 28 extend from the front end of the lateral lines 25 and converge adjacent the drain outlet 23. Such diagonal feed lines 28 are provided with an inclined bottom 29 which is inclined downwardly from the front toward the main drain outlet 23. Such diagonal drains carry grease or other liquids from the bottom 11 to the drain outlet 23 to prevent grease or other liquids from collecting on such bottom 11.

The front wall 12, as best seen in FIGS. 3 and 4 of the drawings, normally projects upwardly from the front edge of the bottom 11, approximately one-third of the total height of the sides 14 and 15. The front wall 12 is provided with a plurality of vertically or upwardly extending support posts 32 which are spaced along the inner surface of the front 12 and whose upper ends or shoulders 32a are below the uppermost edge 12a of the front 12. The upper ends 32a of the support posts 32 are provided for supporting the front edge of a lower grill 36 which, as seen in FIG. 3 of the drawings, is provided for supporting charcoal or other combustible fuel above the bottom 11 and below the adjustable cooking grill 48.

The housing sides 14 and 15, which are formed integrally with the bottom 11 and the front and rear 12 and 13, respectively, are inclined upwardly and outwardly from the bottom 11. Inasmuch as the sides 14 and 15 are substantially mirror images of each other the various portions of the sides 14 and 15 will be identified with common numerals. The sides 14 and 15 have a forward edge 50 which is disposed generally vertically and which is recessed or set back from adjacent the upper edge 12a of the front 12 upwardly to the top of such side walls 14 and 15, respectively. Rearwardly extending shoulders 51 are formed at the opposite ends of the upper edge 12a of the front 12 for receiving the lower edge of the top T to be described in detail hereinafter.

A plurality of vertically spaced laterally offset steps or cooking grill supports 53, 54 and 55, respectively, are formed adjacent the front edge 50 of the end members 14 and 15. As shown in FIG. 4 of the drawings, the forward support steps 53, 54 and 55 preferably have shallow U-shaped grooves or recesses 53a, 54a and 55a, respectively, formed therein for receiving a longitudinally extending support rod 40b positioned adjacent the forward edge of the upper grill 40. Such recesses 53a, 54a and 55a are formed in the upper stepped surfaces of the laterally inwardly projecting support member 57 which is formed on the inner surface of the sides 14 and 15 adjacent the front edge 50 thereof. An intermediate support post 60 projects upwardly above the inner surface of each side 14 and 15 from the bottom 11, and terminates at an upper shoulder 61 in which a grooved recess 62 is formed for receiving the central longitudinally extending support rod 64 which is disposed longitudinally of the lower grill 36.

A plurality of vertically spaced support members 70 are formed adjacent the rear wall 13. Such supports 70 are aligned with the supports 32 on the inner side of the front wall 12 and each of the supports 70 has a shoulder 71 at its upper end which provides a support for the rear rod (not shown) extending along the rear edge of the lower grill 36.

The back wall 13 is provided with a series of vertically spaced horizontally extending steps or ledges 75, 76 and 77, respectively, which are connected by vertical risers 78, 79 and 80, respectively. Each of the ledges is provided with a plurality of spaced projections such as projections 75a on ledge 75, projections 76a on ledge 76, and projections 77a on ledge 77. The projections 75a, 76a and 77a, are aligned with the support rods 32 and 71 therebelow and projections 75a, 76a and 77a are provided with upper shoulders 75b, 76b and 77b, which receive and support the rearmost support rod 40a which extends longitudinally along the rear edge of the upper grid 40.

As shown in FIG. 4 of the drawings, the top of the projections 75a are positioned at substantially the same elevation as the forward notches 53 in the forward support member 56 to support the grill 40 in a substantially horizontal position when it is placed on such supports. Similarly, the intermediate recesses or grooves 54 and the upper grooves 55 are positioned at substantially the same elevations as the rear intermediate and upper supports 76a and 77a so as to provide support means for supporting the grill 40 in a substantially horizontal position in the intermediate or upper position. It will be appreciated that the front to rear spacing between the lower front supports 53 and lower rear supports 71 is approximately the same as the width of the cooking grill 40. Similarly, the front to rear spacing of the intermediate grill supports 54 and 76, and the upper grill supports 55 and 77, respectively, to accommodate the grill 40 at any desired level.

The hinges P, shown in FIGS. 4 and 5 of the drawings, include a base portion 90 fixed to or formed integrally with the upper rear side 13 of the housing H and a lug member 100 formed with the rear side of the top T and adapted to be pivotally mounted in the base 90. The base 90 includes a pair of laterally spaced parallel side supports 91 and 92 formed integrally with the transverse base member 90. The side supports 91 and 92 are provided with upstanding ends 91a and 92a which project upwardly above the top of the back 13 and which are joined adjacent their front edges by a transverse web or member 95. The upper edges 91b and 92b of the side supports 91 and 92, respectively, are are curved at 96 to provide a curved cradle or seat for receiving a correspondingly curved cam surface 10 of the lug 100. The lug members 100 are provided with a rearwardly extending T-shaped projection 102 which includes an outwardly projecting rectangular shaft 102a terminating at the transverse extending cap or head 102a. The cam surface 101 rests on the curved surface 96 and rotates thereon when the top T is open and then closed. The lug 102 is normally positioned between the upstanding ears 91a and 92a, respectively, with the transverse portion 102b of the T-shaped projection 102 positioned behind the transverse web on member 95 extending between the parallel support members 91a and 92a, respectively.

With this arrangement, the top T may be pivoted to an open position whereby the flat top 102b of the lug 102 may be withdrawn from beneath the cross member 95 to thereby permit the top T to be temporarily or permanently removed from the housing H to facilitate washing or cleaning of such top T in the event it becomes soiled. As best seen in FIGS. 1 and 2 of the drawings, the top T comprises an upper plate or transverse extending member 110 and a forward plate or wall 112 which depends downwardly from the forward edge 110a. A pair of laterally spaced sides 114 and 115 depend downwardly from opposite ends 110b and 110c, respectively, of the top 110. Also, the top T is provided with a rear wall section 113 which is positioned at the upper edge of the back member 13 and connects the rear edges of the sides 114 and 115. As shown in the drawings, the sides 114 and 115 and the front 112 and the rear 113 of the top T extend outwardly beyond the perimeter of the top of the housing H to form an annular lip 140 which overlaps the upper perimeter of the front 12, sides 14 and 15 and back 13 of the housing H to provide a substantially tight fit around the perimeter of the opening and thereby control the emission of smoke from the cooker of the present invention when it is in use.

The foregoing disclosure and description of the invention are illustrative and explanatory thereof, and various changes in the size, shape, and materials as well as in the details of the illustrated construction may be made without departing from the spirit of the invention.

What is claimed is:
1. A barbecue cooker comprising:
 a. a housing having a bottom with a rear wall and a pair of side walls extending upwardly from the front and rear edges of said bottom;
 b. a cooking grill adapted to be supported in said housing;
 c. a plurality of vertically spaced front and rear supports for supporting a barbecue grill at various elevations in said housing with front and rear supports at each level spaced rearwardly of the respective adjacent front and rear supports therebelow.
2. The invention of claim 1 wherein said housing includes means for supporting a heat source in said housing vertically spaced above said bottom and beneath said grill.
3. The invention of claim 1 wherein said side walls are disposed substantially vertically relative to said bottom and wherein said vertically spaced front supports are disposed in said side walls and wherein said rear supports are disposed in said rear wall.

* * * * *